US009607501B2

(12) United States Patent
English

(10) Patent No.: US 9,607,501 B2
(45) Date of Patent: Mar. 28, 2017

(54) SYSTEMS AND METHODS FOR PROVIDING EMERGENCY RESOURCES

(71) Applicant: ELERTS CORPORATION, Scituate, MA (US)

(72) Inventor: Edward English, Scituate, MA (US)

(73) Assignee: Elerts Corporation, Scituate, MA (US)

( * ) Notice: Subject to any disclaimer, the term of this patent is extended or adjusted under 35 U.S.C. 154(b) by 230 days.

(21) Appl. No.: 14/378,917

(22) PCT Filed: Feb. 7, 2013

(86) PCT No.: PCT/US2013/025116
§ 371 (c)(1),
(2) Date: Aug. 14, 2014

(87) PCT Pub. No.: WO2013/122809
PCT Pub. Date: Aug. 22, 2013

(65) Prior Publication Data
US 2016/0027290 A1    Jan. 28, 2016

Related U.S. Application Data

(60) Provisional application No. 61/600,143, filed on Feb. 17, 2012.

(51) Int. Cl.
G08B 1/08      (2006.01)
G08B 25/01     (2006.01)
(Continued)

(52) U.S. Cl.
CPC .......... *G08B 25/016* (2013.01); *G08B 25/08* (2013.01); *H04N 5/23203* (2013.01);
(Continued)

(58) Field of Classification Search
CPC .................................. H04W 4/00; G06F 1/00
See application file for complete search history.

(56) References Cited

U.S. PATENT DOCUMENTS 5,497,149 A    3/1996  Fast
8,538,374 B1*  9/2013  Haimo .................... G01S 19/17
                                                370/259

(Continued)

FOREIGN PATENT DOCUMENTS

JP    2003319437 A    11/2003
JP    2005039700 A     2/2005
(Continued)

OTHER PUBLICATIONS

International Preliminary Report on Patentability issued on Aug. 19, 2014 in connection with International Application PCT/US13/25116, 8 pages.
(Continued)

*Primary Examiner* — Shirley Lu
(74) *Attorney, Agent, or Firm* — Gesmer Updegrove LLP

(57) ABSTRACT

A personal security system for use with a personal communication device is disclosed that is capable of sending position information regarding the location of the device to a remote computer-aided dispatch system. The computer-aided dispatch system is coupled to a plurality of security resources within a defined geographic area, and includes a dynamic resource database that includes security resource location information regarding each of a plurality of security resources; and a processing unit for receiving triggering event location data from the personal communication device and for identifying, responsive to the triggering event location data, at least one security resource that is proximate the triggering event.

20 Claims, 7 Drawing Sheets

(51) Int. Cl.
*H04N 5/232* (2006.01)
*H04N 5/247* (2006.01)
*G08B 25/08* (2006.01)
*H04N 7/18* (2006.01)
*H04W 4/02* (2009.01)
*H04W 4/22* (2009.01)
*G08B 13/196* (2006.01)

(52) U.S. Cl.
CPC ............. *H04N 5/247* (2013.01); *H04N 7/181* (2013.01); *H04W 4/021* (2013.01); *H04W 4/025* (2013.01); *H04W 4/22* (2013.01); *G08B 13/19645* (2013.01)

(56) References Cited

U.S. PATENT DOCUMENTS

| | | | |
|---|---|---|---|
| 2002/0137525 | A1 | 9/2002 | Fleischer et al. |
| 2003/0067542 | A1 | 4/2003 | Monroe |
| 2005/0239477 | A1 | 10/2005 | Kim et al. |
| 2007/0270163 | A1* | 11/2007 | Anupam ............ G06Q 30/0251 455/456.1 |
| 2010/0231714 | A1* | 9/2010 | Flores .............. G08B 13/19613 348/143 |

FOREIGN PATENT DOCUMENTS

| | | |
|---|---|---|
| JP | 2007156967 A | 6/2007 |
| KR | 20100092177 A | 8/2010 |

OTHER PUBLICATIONS

International Search Report and Written Opinion issued on May 28, 2013 in connection with International Application PCT/US13/25116, 12 pages.
Extended Search Report issued by the European Patent Office on Aug. 7, 2015 in connection with related European patent application No. 13749128.8, 8 pages.
International Preliminary Report on Patentability issued in related International Patent App. No. PCT/US2013/025116 on Aug. 28, 2014 (9 pages).
European Communication issued by the European Patent Office on Aug. 16, 2016 in Europe Application No. 13749128.8.

* cited by examiner

32

DRD

DYNAMIC RESOURCE DATABASE

| RESOURCE CLASS | AVAILABLE RESOURCES | WHEN AVAILABLE | RESOURCE LOCATION |
|---|---|---|---|
| CCTV CLASS | CCTV 1<br>CCTV 2<br>CCTV 3<br>CCTV 4 | NOW<br>NOW<br>NOW<br>NOW | LONG/LAT ELEV,DIR., SPEED |
| BLUE CLASS | BLUE LIGHT 1<br>BLUE LIGHT 2<br>BLUE LIGHT 3 | NOW<br>NOW<br>NOW | LONG/LAT ELEV,DIR., SPEED |
| SOFF CLASS | SECURITY OFFICER 1<br>SECURITY OFFICER 2<br>SECURITY OFFICER 3 | NOW<br>10:30<br>NOW | LONG/LAT ELEV,DIR., SPEED |
| PCAR CLASS | PATROL CAR 1<br>PATROL CAR 2 | NOW<br>12:30 | LONG/LAT ELEV,DIR., SPEED |
| AMB CLASS | AMBULANCE 1<br>AMBULANCE 2 | 14:00<br>NOW | LONG/LAT ELEV,DIR., SPEED |
| FIRE CLASS | FIRE TRUCK 1<br>FIRE TRUCK 2 | NOW<br>NOW | LONG/LAT ELEV,DIR., SPEED |
| ETC | ETC | ETC | ETC |

FIG. 2

SYSTEMS AND METHODS FOR PROVIDING EMERGENCY RESOURCES

CROSS-REFERENCE TO RELATED APPLICATIONS

The present invention is a U.S. National Stage filing under 35 U.S.C. 371(c) of International Application No. PCT/US13/25116 filed Feb. 7, 2013, which claims priority to U.S. Provisional Appln. No. 61/600,143 filed on Feb. 17, 2012, both of which are incorporated herein by reference in their entireties.

BACKGROUND OF THE INVENTION

The present invention relates generally to emergency response systems for providing emergency assistance in response to distress information.

Emergency response systems are generally designed to provide a person (e.g., a victim of a crime) with emergency response, preferably quickly enough to ensure that security personnel are on the scene early enough to stop or otherwise thwart the criminal act.

Millions of security surveillance cameras, sometimes referred to as CCTV (closed-circuit television) cameras, are installed worldwide. Some surveillance cameras are publicly viewable, internet-connected cameras. For simplicity, security surveillance cameras are referred to as a whole as "CCTV cameras". CCTV cameras are installed to monitor activity, persons or property, and often are used to record or deter criminal or suspicious activities. CCTV cameras are used in both public and private areas. It is well known that many public areas are under surveillance, both domestically in the USA and in other countries such as Britain where some estimate there is at least one CCTV camera for every 32 citizens.

CCTV cameras are often mounted to buildings, poles, ceilings or walls and are positioned to allow the camera to have a 'view' of an area to monitor for suspicious or criminal activities. The view range for some CCTV cameras may be altered remotely by exercising the CCTV cameras pan, tilt or zoom capabilities. Other CCTV cameras are fixed-mounted without the capabilities to alter the camera view range or angles.

CCTV cameras may be wireless and communicate by a means such as WIFI, or may be hard-wired by means such as coax or Ethernet cables, which provide connectivity between the camera and a security monitoring control room (SMCR) or station. One example of such a control room is a police dispatch center with equipment such as TVs or monitor screens that may display images or video from the CCTV cameras. A SMCR may have one viewable screen per CCTV camera, to view images or video that is transferred from the camera to display, controller or recording equipment in the SMCR. There are however, typically far fewer display monitors than cameras.

Some SMCRs have large screen monitors that allow viewing 4, 8 or more CCTV imagery on a single screen. Display screens may be controlled and programmed to rotate their views to different CCTV cameras in the field, which results in only a subset of all CCTV cameras available being displayed at any given time. The CCTV camera displays may be controlled by program code or manually to show areas of prime interest or to simulate a virtual patrol walk around the campus or area being monitored.

Often a security officer in a SMCR must manually choose which camera(s) to view on screen. Some methods used to select CCTV camera(s) to view include typing a camera number into a keypad, (e.g., "show CCTV camera #238") pushing a button on a camera controller-selector device, using voice recognition software, or by moving a cursor on a computer display and selecting the camera(s) to show. The software used to control and manage CCTVs is often referred to as a Video Management System (VMS). A VMS such as those offered by On-Net Surveillance Systems, Inc. of Pearl River, N.Y. (OnSSI), Exacq Technologies, Inc. of Fishers, Ind., Milestone AV Technologies LLC of Savage, Minn. or Genetec, Inc. of Saint-Laurent, Canada, may be utilized to control and manage which camera(s) video feed(s) are displayed.

A VMS can display video feeds from one or more cameras when a person operating the VMS user-interface instructs the VMS to do so, or by other software, to control the VMS by sending text strings or other commands to the VMS Application Programming Interface (API). Some CCTV camera controllers have motion sensors associated with them to cause their imagery to be highlighted or selected when motion occurs. Other systems use artificial intelligence computational methods that may employ pattern recognition to determine "CCTV cameras of interest".

In many cases, CCTV camera video and images are recorded to tape, disk or other storage mediums for later retrieval, if needed to perform a post-event analysis or investigation of a security-event or crime. Many institutions or organizations have hundreds or thousands of CCTV cameras installed in areas they wish to monitor or protect. The larger the number of CCTV cameras installed by any given organization, the more prohibitively expensive it is to employ a staff of CCTV camera-watcher people to actively study every CCTV camera screen, at all times. In addition to being very expensive, there is a human fatigue factor that may lead to the conclusion that it is impractical to employ humans to watch all possible CCTV cameras at all times. Given the expensive cost to have an employee watch each camera screen, many organizations choose to instead use recorded CCTV camera footage as a post-mortem tool for investigations after an incident has occurred.

CCTV cameras are just one type of security tool that may be deployed to assist witnesses, victims or security personnel to help resolve a criminal or suspicious event. In particular, some criminal response systems rely on a victim traveling to a security office (e.g., an area police station) to report a crime, or rely on emergency response devices such as blue light units that are located throughout a defined area, such as a college campus, or a hospital grounds, or another large place of employment, public access or entertainment that covers a large geographic area. Blue light units may have or be outfitted with sirens, flashing lights, or speakers to bring attention to an area during an incident. Such blue light units require that a victim interact with the unit (e.g., by calling a number or pushing a button or sequence of buttons) to alert a central security office of a criminal act.

Unfortunately, the circumstances of some criminal acts do not provide victims with such an opportunity to run off and interact with a blue light unit. Also, waiting until the perpetrator has left the scene, can result in the victim either not reporting the criminal act (which happens often) or leaving the security personnel with the difficult task of first identifying the perpetrator and then tracking down the perpetrator.

In short, many security systems for defined areas, again such as college campuses, hospitals and other places of employment or public access or entertainment venues that cover a large geographic area, are currently monitored by security cameras, and the systems rely on the cameras to capture a criminal act, and to immediately alert a security person of the criminal act. Unfortunately however, individual cameras in such camera based security systems are either (sometimes unknowingly) not operational or provide such a large amount of information (e.g., dozens or hundreds of monitoring screens) that the security personnel at the security headquarters are unable to effectively monitor all cameras in real time. In this case, the camera based security system provides value, but primarily only in seeking to investigate a criminal or suspicious event after it has occurred.

There is a need therefore, for a security response system that more quickly and effectively responds to an emergency.

SUMMARY OF THE INVENTION

In accordance with an embodiment, the invention provides a personal security system for use with a personal communication device is disclosed that is capable of sending position information regarding the location of the device to a remote computer-aided dispatch system. The computer-aided dispatch system is coupled to a plurality of security resources within a defined geographic area, and includes a dynamic resource database that includes security resource location information regarding each of a plurality of security resources; a triggering event reception unit for receiving triggering event location data from the personal communication device; and an identification unit for identifying, responsive to the triggering event location data, at least one security resource that is proximate the triggering event.

In accordance with another embodiment, the invention provides a method of providing personal security. The method includes the steps of providing a computer-aided dispatch system that is coupled to a plurality of security resources within a defined geographic area; providing a dynamic resource database that includes security resource location information regarding each of the plurality of security resources; receiving triggering event location data from a personal communication device responsive to a triggering event; and determining, responsive to the triggering event location data, at least one security resource that is proximate the triggering event.

In accordance with a further embodiment, the invention provides a personal security system for use with a personal communication device that is capable of sending position information regarding the location of the device as well as a digital image of an event to a remote computer-aided dispatch system. The computer-aided dispatch system is coupled to a plurality of security resources within a defined geographic area, and includes a dynamic resource database, a computer system, and a display. The dynamic resource database includes security resource location information regarding each of a plurality of security resources. The computer system is employed to identify, responsive to the triggering event location data received from the personal communication device, at least one security resource that is proximate the triggering event. The display is employed to display the digital image at the computer aided dispatch system.

BRIEF DESCRIPTION OF THE DRAWINGS

The following description may be further understood with reference to the accompanying drawings in which:

FIG. 2 shows an illustrative graphical representation of a dynamic resource database table for use in a system in accordance with an embodiment of the present invention;

The drawings are shown for illustrative purposes only.

DETAILED DESCRIPTION

The invention involves, in part, providing a security response system that effectively and efficiently utilizes existing security equipment and personnel within a monitored environment.

It has been discovered that video from CCTV cameras may be used to actively intercept criminal or suspicious activities, if there is a way for a signal to be sent to the security monitoring control room (SMCR), indicating which CCTV camera(s) a security person or security equipment should be looking at or recording, during the time when an incident of interest is occurring. The present invention provides a system and method that generates such a signal to be sent to the SMCR that may be generated by a person using a smartphone or other device to send a message to the SMCR to indicate the location area of an event of interest.

A security system in accordance with an embodiment of the invention includes a personal communication device that transmits data regarding a user's location (longitude, latitude and optionally, altitude) as well as, optionally, the rate of movement and direction or movement of the user to a resource control system. The personal communication device, such as a smart phone, either includes an application that directly contacts the SMCR and provides the user's location information, or includes a pre-programmed telephone number and directly calls the SMCR, again, providing the user's location information.

When a security incident is reported, a central security person may respond accordingly as discussed in more detail below. An incident may be reported by either having a person (victim or witness) activate a switch, e.g., either a help switch or an escort switch that remains activated until the user confirms safe travel to their destination such as a car or dorm room.

Figure 1:
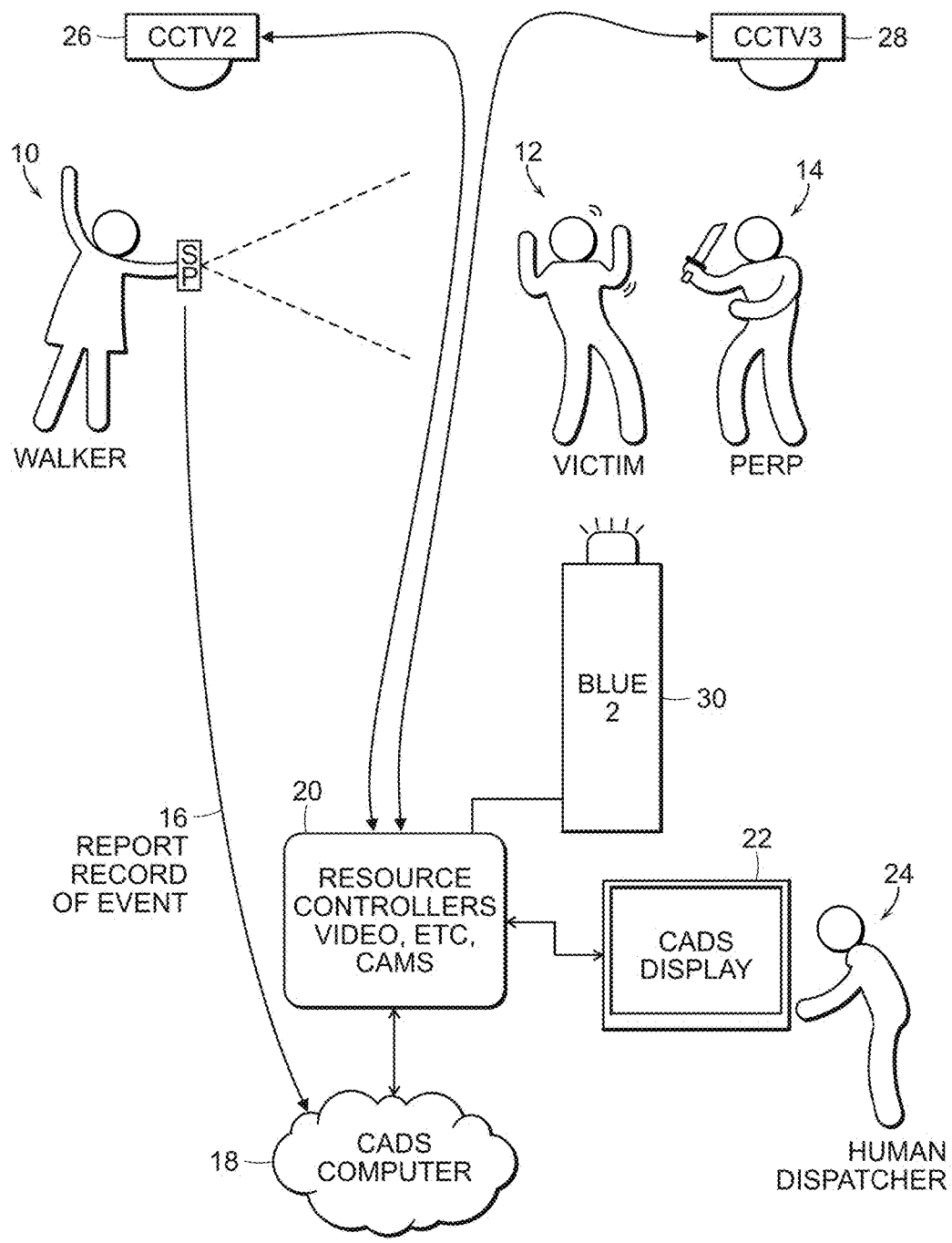
FIG. 1 shows an illustrative diagrammatic view of a security system in accordance with an embodiment of the invention.

For example, with reference to FIG. 1, a system in accordance with an embodiment of the invention may involve a witness 10 that uses a personal communication device, such as a smartphone, to capture an image of a criminal event that is occurring, such as an attack on a victim 12 by a perpetrator 14. A report of the incident is transmitted as shown at 16 to a Computer-Aided Dispatch System (CADS) that includes a computer system 18 as well as resource controllers 20. The computer system may include any of conventional main frame, desktop, laptop, or tablet computers that are connected to the resource controllers as well as to a network such as the Internet and/or conventional telephone networks. The record may include: photo, video, audio, text description etc. and proximity data about the event. Proximity data may include location of witness or event, such as longitude, latitude and elevation, time and motion data, such as speed, acceleration, and direction (northwesterly etc.).

The data record that is created by the witness is transmitted or queued for transmission to Computer-Aided Dispatch System (CADS), where information in the data record is used to monitor, focus, record or remediate the event by determining and utilizing the Best Available Resources (BAR). As shown at 32 in FIG. 2 and in Table 1 below, the Best Available Resources may include cameras (CCTVs), blue light units, security officers on foot, security officers in patrol cars, ambulance(s) and fire truck(s). The most recent location (availability, longitude, latitude, and optionally, elevation, and if moving, the speed and direction) of each of these resources must be known and maintained in the database.

The database may be stored on a local computer or on an in-the-cloud server. The database is structured to organize a set of tables of LAT/LON location data points, which may optionally include elevation also, into "geographic polygons" which represent a perimeter mapping of the areas of interest, per resource. For example, geographic polygons would define a field of view area for each individual CCTV camera.

TABLE 1

DYNAMIC RESOURCE DATABASE (DRD)

| Resource Class | Available Resources | When Available | Resource Location |
|---|---|---|---|
| CCTV Class | CCTV 1 | Now | Long/Lat, Elev, |
|  | CCTV 2 | Now | Dir, Speed |
|  | CCTV 3 | Now |  |
|  | CCTV 4 | Now |  |
| BLUE Class | Blue Light 1 | Now | Long/Lat, Elev, |
|  | Blue Light 2 | Now | Dir, Speed |
|  | Blue Light 3 | Now |  |
| SOFF Class | Security Officer 1 | Now | Long/Lat, Elev, |
|  | Security Officer 2 | 10:30 | Dir, Speed |
|  | Security Officer 3 | Now |  |
| PCAR Class | Patrol Car 1 | Now | Long/Lat, Elev, |
|  | Patrol Car 2 | 12:30 | Dir, Speed |
| AMB Class | Ambulance 1 | 14:00 | Long/Lat, Elev, |
|  | Ambulance 2 | Now | Dir, Speed |
| FIRE Class | Fire Truck 1 | Now | Long/Lat, Elev, |
|  | Fire Truck 2 | Now | Dir, Speed |

Again, with reference to FIG. 1, the CADS computer 18 uses a record of the event to query the DRD to determine the Best Available Resources. The CADS computer 18 then uses the location of the event (proximity data) and the most recent location data for each available resource to determine which are the closest available (Best Available) resources, such as for example, video camera 26 (CCTV2), video camera 28 (CCTV3) and blue light unit 30 (BLUE 2). There are many "nearest neighbor" algorithms, known to those skilled in the art, may be employed to mathematically determine the distances between two objects of known locations (or the nearest point in a view range of a particular CCTV camera) and calculate which objects are the closest to the location of the event. The CADS computer 18 then directs the resource controllers 20 to activate, control, monitor and focus the Best Available Resource on the event, and/or informs human dispatcher 24 to review the CADS display 22. In the case of a CCTV camera, the CADS computer may control the displaying of live or recorded video footage from camera(s) near the incident, by sending commands to a VMS API.

Figure 3:
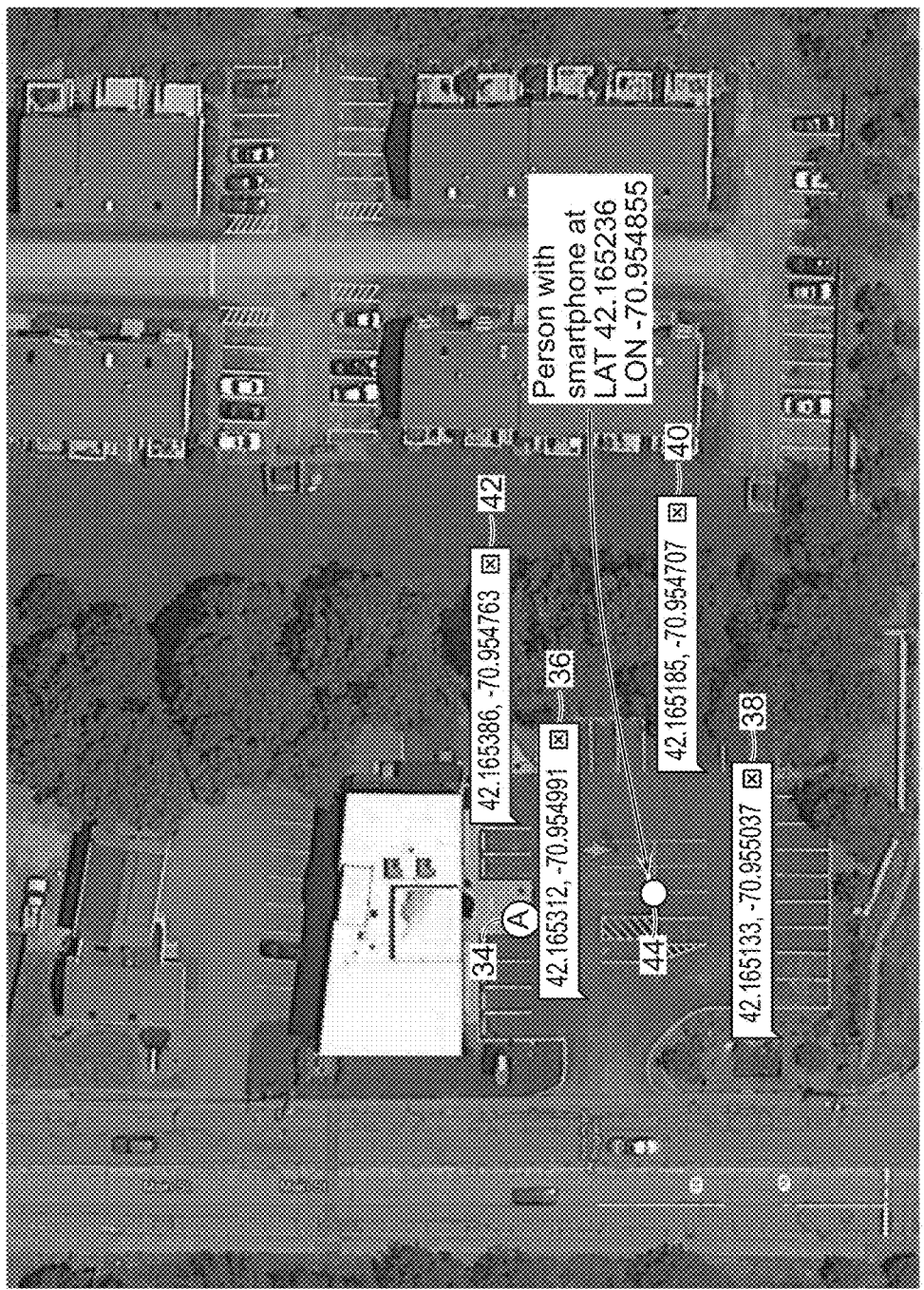
FIG. 3 shows an illustrative diagrammatic aerial view of a geographic area that includes a camera that is mapped for an assigned area of range of view.

With reference to FIG. 3, a polygon area is defined for each camera in a personal security system. The area may be defined by having a person stand is designated points (e.g., 3, 4 or 5 locations) that together with straight lines connecting the points, define the boundaries of the field of view of each camera. FIG. 3 for example, shows at 34 a camera for which points 36, 38, 40 and 42 are recorded. Any number of points may be developed for each camera. Table 2 below shows the longitude and latitude for each of the four points 36, 38, 40 and 42 in FIG. 3.

TABLE 2

| Point | Latitude | Longitude |
|---|---|---|
| 36 | 42.165312 | −70.954991 |
| 38 | 42.165133 | −70.955037 |
| 40 | 42.165185 | −70.954707 |
| 42 | 42.165366 | −70.954763 |

The data is then entered into a database that includes such data for all cameras and other equipment in the defined geographic area. The polygon is defined by straight lines that connect the camera 34 to point 36, then point 36 to point 38, then point 38 to point 40, then point 42 to the camera 34. If a person is then standing at point 44 and contacts a dispatcher, that person's latitude and longitude are sent to the resource controller, and the system determines, for each camera, whether the person (whose latitude and longitude for example are 42.165236 and −70.954855) is within the polygon and therefore is within the field of view of the camera 34.

The determination of whether a person's latitude and longitude are within a range of points for each camera may be achieved by a variety of methods, including for example, using a Nearest Neighbor Search. As is known in the art, a Nearest Neighbor Search is an optimized process for finding closest points in metric spaces, such as by using for example, a linear search, space partitioning, locality sensitive hashing, vector approximation, compression/cluster based searches or variations thereof. The process of Nearest Neighbor Interpolation may also be employed for multivarient interpolation of points in one or more dimensions.

In many conventional security offices, a dispatcher may at any time be reviewing a large number of video images, and/or the images may switch at timed intervals between different camera views. In accordance with the present invention, when an event is registered, the CADS computer causes the closest video camera to the event, to show on the CADS display monitor(s). The human dispatcher will therefore unavoidably be directly shown the event that is occurring. Each event is therefore, monitored, recorded, and/or remediated until the event is concluded.

Figure 4:
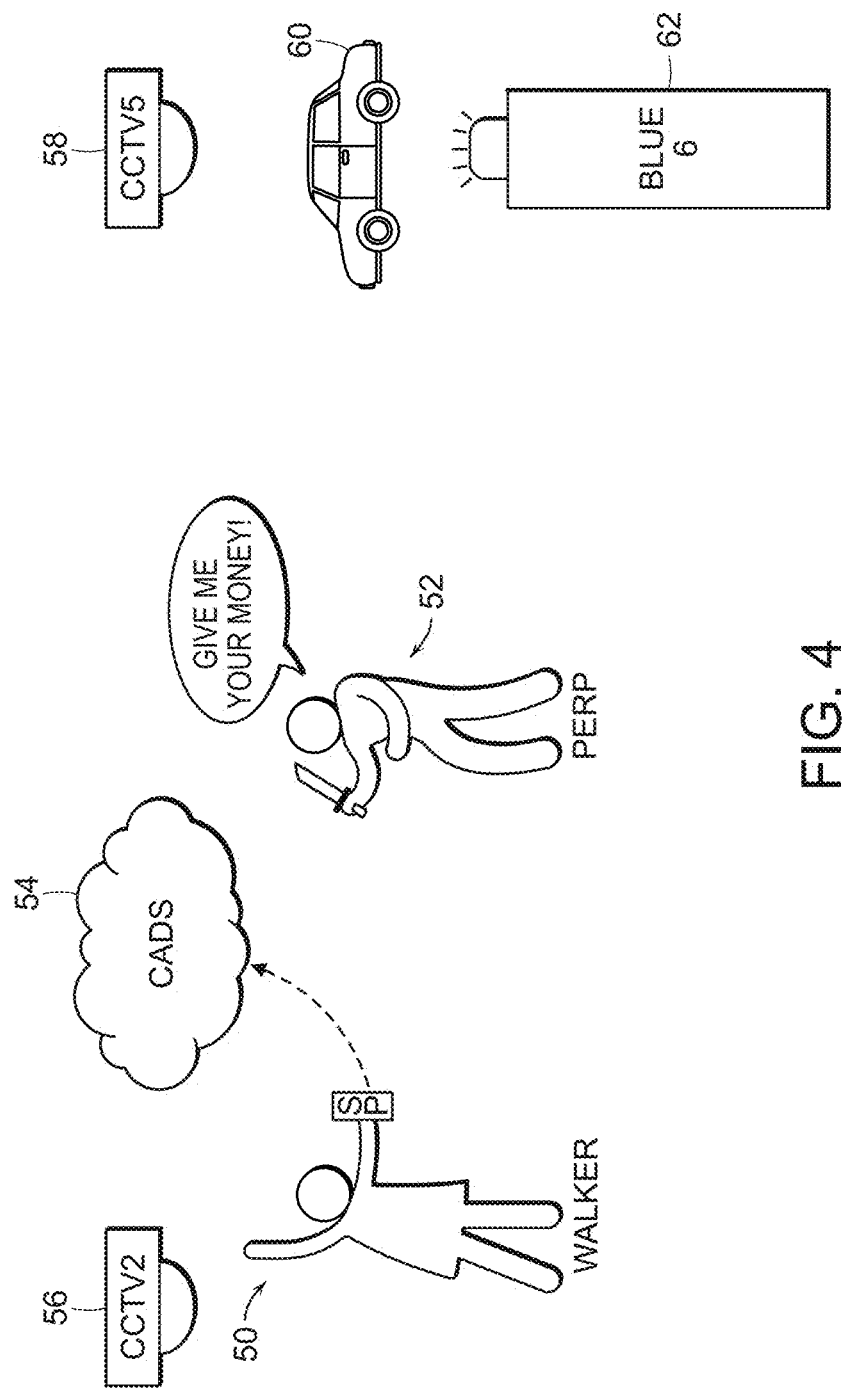
FIG. 4 shows an illustrative diagrammatic view of a security system in accordance with another embodiment of the invention.

In accordance with another embodiment, and with reference to FIG. 4, a user 50 may engage an escort application on a smart-phone, iPad or other computer tablet device that includes either a peril mode switch, or that includes a switch that is held down by the user wherein its release (unless cancelled) indicates that the user is in danger (e.g., a deadman's switch). The user (who had previously registered with the application and provided personal information to the application), would engage the escort application upon leaving a school, workplace or other safe area. The person, referred to herein as a Walker, opens the personal security application on their smart phone and chooses to activate Escort Me mode. Once Walker begins Escort Mode, a proximity data record is created noting walk details such as current location time, direction and speed, etc. The proximity data record is sent to CADS, or is queued for sending later when connectivity allows.

A report of an incident (e.g., an assault by a perpetrator 52) is transmitted to the Computer-Aided Dispatch System (CADS) 54. Proximity data may include location of witness or event, such as longitude, latitude and elevation, time and motion data, such as speed, acceleration, direction (northwesterly etc.). The data record that is created by the victim or witness is transmitted or queued for transmission to Computer-Aided Dispatch System (CADS), where information in the data record is used to monitor, focus, record or remediate the event by determining and utilizing the Best Available Resources (BAR).

Again, the Best Available Resources may include cameras, blue light units, security officers on foot, security officers in patrol cars, ambulance(s) and fire truck(s). The location (availability, longitude, latitude, and optionally elevation, and if moving, the speed and direction) of each of these resources must be known and maintained in the database.

The CADS computer 54 uses a record of the event to query the DRD to determine the Best Available Resources. The CADS computer 54 then uses the location of the event (proximity data) and communicates with the resource controllers to engage the closest available resources, such as for example, video camera 56 (CCTV2), video camera 58 (CCTV5), blue light unit 62 (BLUE 6), and patrol car 60 upon determining that these resources are the closest available (Best Available) resources. The CADS computer 54 then activates, controls, monitors and focuses the Best Available Resource on the event, or informs a human dispatcher to review the CADS display as discussed above.

In certain further embodiments, the escort application on the Walker's smartphone may continuously and periodically generate and send updated proximity data (longitude, latitude and elevation data) records to the CADS computer 54, creating a log of how Walker's journey began and progressed. As the CADS computer receives updated Walker data, the CADS computer 54 continuously updates its list of Best Available Resources. Optionally a human dispatcher could activate the Best Available Resources, such as CCTV camera, to record or view segments of the Walker's journey.

If the Walker's escort application enters Peril Mode, either from a deadman switch and timeout, or from the Walker manually or vocally selecting Peril Mode, then the CADS computer 54 makes available a list of Replay Resources to view Walker's current environment/surroundings or to replay such images for the time period prior to the Peril Mode being activated. Optionally, the Escort Me application may also record audio or video for all or part of the journey, or from the time that the Peril Mode was activated. The Peril Mode could optionally be triggered upon entering or leaving a defined area. The human dispatcher would then use quick access to the Best Available Resources, such as video CCTVs to record, monitor and or remediate the Peril Mode event.

In accordance with a further embodiment, the system may provide predicted path escort application in which a Trigger Condition causes a mobile device (MD) to transmit a Proximity Information Record (PIR), including details regarding the location of the MD, to a CADS computer which uses the PIR to determine and bring attention to certain security resources (SR) that are nearby the MD, along the path traveled recently by the MD, or along a predicted path of travel for the MD. A triggering event may be any of traveling off of the path 94, or having speed of travel suddenly stop or become very slow or very fast (running), or a manual button push or release as discussed above.

Figure 5:
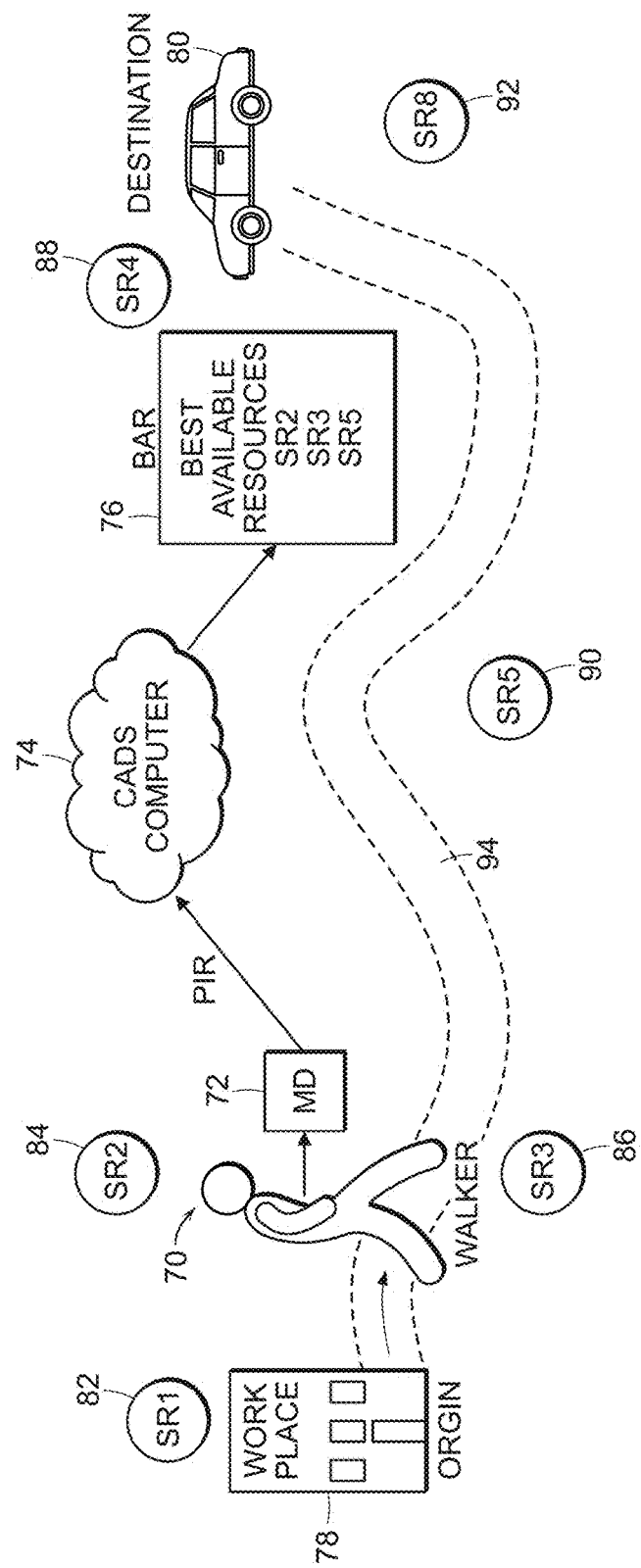
FIG. 5 shows an illustrative diagrammatic view of a security system in accordance with a further embodiment of the invention.

With reference to FIG. 5, the system may provide that a Walker 70 having a smart-phone, iPad or other computer tablet 72 is walking from, for example, a place of work 78 along a path 94 to a destination 80 such as a car. Again, proximity data may include longitude, latitude and elevation, time and motion data, such as speed, acceleration, and direction. The data record that is created by the witness is transmitted or queued for transmission to Computer-Aided Dispatch System (CADS), where information in the data record is used to monitor, focus, record or remediate an event by determining and utilizing the Best Available Resources (BAR) as discussed herein.

Again, the Best Available Resources may include cameras, blue light units, security officers on foot, security officers in patrol cars, ambulances and fire trucks. The location (availability, longitude, latitude, elevation, and if moving, the speed and direction) of each of these resources must be known and maintained in the database.

The CADS computer 74 uses a record of an event to query the DRD to determine the Best Available Resources. The CADS computer 54 then uses the location of the event (proximity data) and communicates with the resource controllers to determine the closest available security resources 82, 84, 86, 88, 90, 92, such as for example, video cameras, blue light units, patrol cars, sirens, lights, security personnel or equipment, defibrillator, etc. upon determining that these resources are the closest available (Best Available) resources. The CADS computer 74 then activates, controls, monitors and focuses the Best Available Resource on the event, or informs a human dispatcher to review the CADS display as discussed above. The proximity information record (PIR) may include longitude and latitude, and/or FIPS or other area identifiers, time stamp, location history, movement status, speed, direction, elevation, etc. A trigger condition may also be an absolute speed or motion detected (e.g., shaking the MD), or a direction of an unexpected relative change to speed, motion or direction, etc.

A Predicted Path Algorithm may anticipate the near-term future location(s) of MD, based upon characteristics known about path of journey already recorded, or by an indicator of destination entered by a person carrying MD or by recognition and recall of path(s) taken in the past, historically when a person with an MD embarked on a similar journey. The Best Available Resources are determined by correlating PIR to the pre-defined database of SR's, including SR location, availability and capabilities (e.g., focal range).

The cameras for use in the above embodiments should have their operational view ranges surveyed and mapped out with the range areas defined in the database. This includes fully exercising the pan, tilt and zoom capabilities of each camera to ensure that the database encompasses the full view range of each camera. This may be done by using a location device (again, such as person holding a smartphone) to move around the area associated with each camera, and have a central dispatch person note when the person holding the smart phone is visible. The data provided by these maps is employed by the database and may be represented as a set of geographic perimeter-defining polygons utilizing LAT/LON, and optionally elevation points, that represent the field of view for each camera.

The location data from the incident is compared to the field of view polygons, to determine which camera(s) are nearby the incident report location. Common API tools exist to determine if a given LAT/LON point falls within a polygon. One example of such an API is the GIS (Geographic Information Systems) Extension for MySQL (sold by MySQL AB of Sweden), specifically the intersects function, which takes as parameters a point and a polygon. The intersects function returns whether the point falls within the polygon or not. If it does, it is known which camera is associated with that particular field of view polygon and the appropriate instruction may be sent to the CADS or VMS to display that camera's video. Another API tool that may be used in certain applications is Google Maps API (sold by Google, Inc. of Mountain View, Calif.), which can determine if a given LAT/LON point falls within a polygon record of LAT/LON points.

Figure 6:
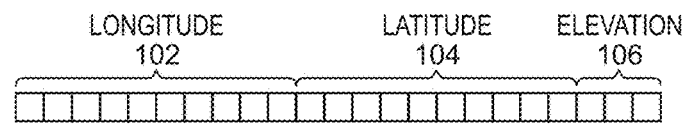
FIG. 6 shows an illustrative diagrammatic view of triggering event location data in accordance with an embodiment of the present invention.

As shown in FIG. 6, the triggering event data 100 may include a portion 102 that provides longitude data, a portion 104 that provides latitude data and a portion 106 that provides elevation data. In further embodiments, the triggering event data may also include personal information regarding the owner of the personal communication device that is sending the triggering event data, as well as a photographic image that has been taken by the device (as discussed above with reference to FIG. 1).

Figure 7:
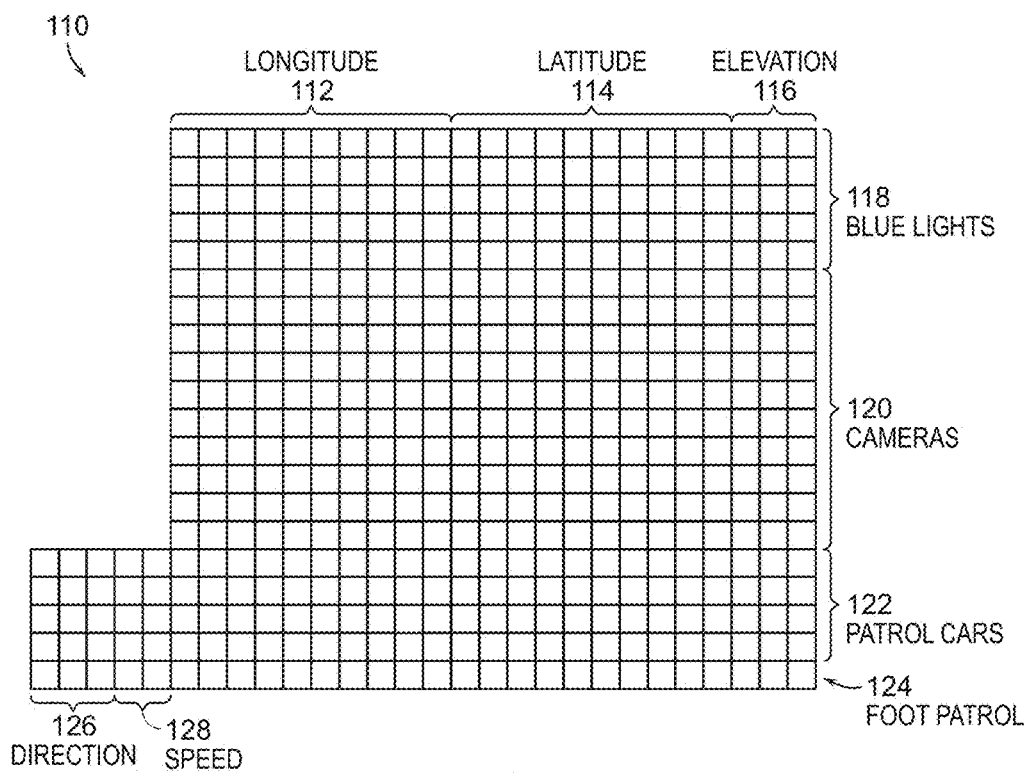
FIG. 7 shows an illustrative diagrammatic view of security resource location data for a plurality of security resources in accordance with an embodiment of the present invention.

As shown in FIG. 7, security resource location data 110 for a plurality of security resources (blue lights 118, cameras 120, patrol cars 122, foot patrol 124) may include longitude data 112, latitude data 114, and elevation data 116. The cameras may each include a large number of location point entries, associated with the field of view of the camera. In some embodiments, this data may be provided by representing the data as a set of ranges of locations, corresponding to the field of view of the camera. The non-fixed security resources will also include direction of movement data 126 as well as speed of movement data 128.

Figure 8:
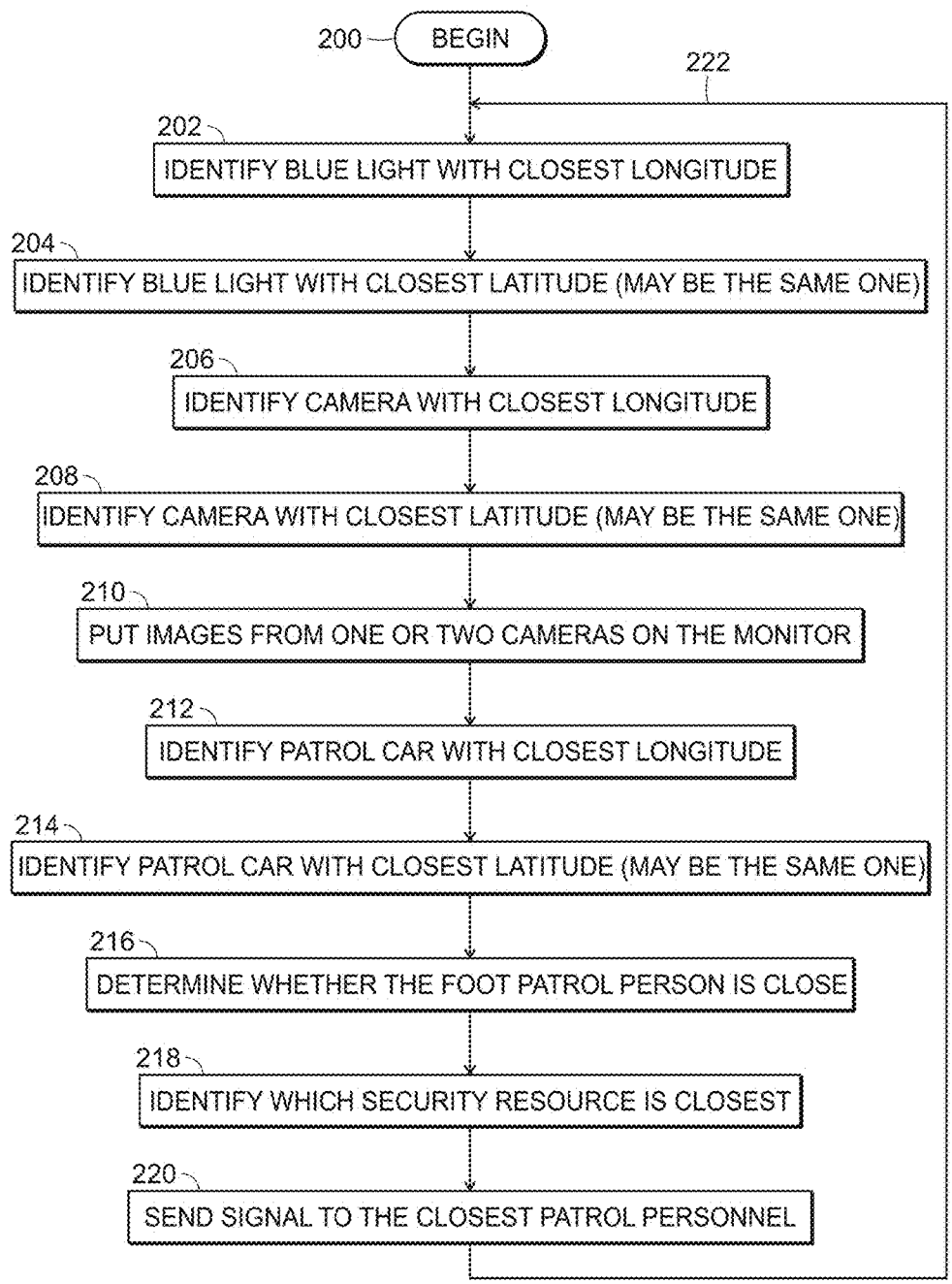
FIG. 8 shows an illustrative diagrammatic view of an identification process for determining at least one security resource that is proximate a triggering event in accordance with an embodiment of the present invention.

As shown in FIG. 8, a process of identifying the closest security resource begins (step 200) by identifying the blue light with the closest longitude data to that of the triggering event data (step 202). The process then identifies the blue light with the closest latitude data to that of the triggering event data (step 204). These may be the same blue light or may be different blue lights. If two are identified, both are considered to be close.

Next, the process identifies the camera with the closest longitude data to that of the triggering event data (step 206), and then the camera with the closest latitude data to that of the triggering event data (step 208). Again, the camera data may be stored as an array of point locations or as a set of ranges of longitude and latitude data. These may be the same camera or may be different cameras. If two are identified, both are considered to be close, and images from one or both cameras are immediately displayed on the Computer-Aided Dispatch System Monitor.

The process then identifies the patrol car with the closest longitude data to that of the triggering event data (step 212), and then the patrol car with the closest latitude data to that of the triggering event data (step 214). Again, these may be the same patrol car or may be different patrol cars, and if two are identified, both are considered to be close.

The process then determines whether the foot patrol personnel is close (step 216), and determines which security resource is closest to the triggering event location (step 218) (and/or which one or more stand out as being clearly the closest). A signal that includes the triggering event location is also sent to the closest patrol personnel (step 220). The process then loops back (step 222) to the identifying the closest security resource since, at least the victim and the non-fixed security resources may move.

Those skilled in the art will appreciate that numerous modifications and variations may be made to the above disclosed embodiments without departing from the spirit and scope of the present invention.

What is claimed is:

1. A personal security system for use with a personal communication device that sends position information regarding the location of the device to a remote computer-aided dispatch system, said computer-aided dispatch system being coupled to a plurality of security resources within a defined geographic area, and comprising: a dynamic resource database that includes security resource location information regarding each of a plurality of security resources; and processing means for receiving triggering event location data from the personal communication device and for identifying, responsive to the triggering event location data, at least one security resource that is proximate the triggering event.

2. The personal security system as claimed in claim 1, wherein said plurality of resources includes blue light units at fixed locations.

3. The personal security system as claimed in claim 2, wherein the blue light units each include a feature such as a siren that may be selectively actuated by a security dispatch personnel.

4. The personal security system as claimed in claim 1, wherein said plurality of resources includes video cameras at fixed locations.

5. The personal security system as claimed in claim 1, wherein said plurality of resources includes security personnel at non-fixed locations, wherein the location data in the dynamic resource database is continuously updated.

6. The personal security system as claimed in claim 1, wherein said system includes a computer-aided dispatch system includes a display monitor that provides an image from the at least one security resource that includes a video camera.

7. The personal security system as claimed in claim 1, wherein said computer-aided dispatch system monitors speed and direction of movement of the personal communication device, and records speed and direction data over a time period.

8. The personal security system as claimed in claim 7, wherein the triggering event location data is provided responsive to the speed and direction data.

9. A method of providing personal security, said method comprising the steps of
providing a computer-aided dispatch system that is coupled to a plurality of security resources within a defined geographic area;
providing a dynamic resource database that includes security resource location information regarding each of the plurality of security resources;
receiving triggering event location data from a personal communication device responsive to a triggering event; and
determining, responsive to the triggering event location data, at least one security resource that is proximate the triggering event.

10. The method as claimed in claim 9, wherein said plurality of resources includes blue light units at fixed locations.

11. The method as claimed in claim 10, wherein said method includes the step of selectively actuating a security feature on a blue light unit.

12. The method as claimed in claim 9, wherein said plurality of resources includes video cameras at fixed locations.

13. The method as claimed in claim 9, wherein said plurality of resources includes security personnel at non-fixed locations, wherein the location data in the dynamic resource database is continuously updated.

14. The method as claimed in claim 9, wherein said system includes the computer-aided dispatch system includes a display monitor that provides an image from the at least one security resource that includes a video camera.

15. The method as claimed in claim 9, wherein said method further includes the step of monitoring speed and direction of movement of the personal communication device over a period of time, and recording speed and direction data.

16. The method as claimed in claim 15, wherein the triggering event location data is provided responsive to the speed and direction data.

17. A personal security system for use with a personal communication device that sends position information regarding the location of the device as well as a digital image of an event to a remote computer-aided dispatch system, wherein said computer-aided dispatch system is coupled to a plurality of security resources within a defined geographic area, and comprises: a dynamic resource database that includes security resource location information regarding each of a plurality of security resources; a computer system for identifying, responsive to the triggering event location data received from the personal communication device, at least one security resource that is proximate the triggering event; and a display for displaying the digital image at the computer aided dispatch system.

18. The personal security system as claimed in claim 17, wherein said plurality of security resources includes a plurality of cameras, and wherein an image from the at least one security resource that is proximate the triggering event at the computer aided dispatch system.

19. The personal security system as claimed in claim 18, wherein said plurality of security resources further includes a plurality of blue light units at fixed locations.

20. The personal security system as claimed in claim 18, wherein said security resource location information for each of the plurality of security resources includes latitude and longitude information for each of the cameras defining a field of view of each camera.

* * * * *